United States Patent
Kobayashi et al.

[11] Patent Number: 5,947,233
[45] Date of Patent: Sep. 7, 1999

[54] DISC BRAKE

[75] Inventors: Kinzo Kobayashi; Naganori Koshimizu, both of Yamanashi-ken; Kazuhiro Doi, Kanagawa-ken; Tadashi Tamasho, Kanagawa-ken; Tomihiro Suenaga, Kanagawa-ken, all of Japan

[73] Assignees: Tokico Ltd., Kawasaki, Japan; Nissan Motor Co., Ltd., Yokohama, Japan

[21] Appl. No.: 08/888,395

[22] Filed: Jul. 7, 1997

[30] Foreign Application Priority Data

Jul. 9, 1996 [JP] Japan .................................. 8-198387

[51] Int. Cl.⁶ ............................................. F16D 55/22
[52] U.S. Cl. ...................... 188/72.3; 188/73.38; 188/1.11
[58] Field of Search ........................... 188/1.11 W, 73.38, 188/73.45, 73.35, 73.36, 73.37, 72.3

[56] References Cited

U.S. PATENT DOCUMENTS

| | | |
|---|---|---|
| 4,245,723 | 1/1981 | Moriya . |
| 4,364,445 | 12/1982 | Oshima .................................. 188/1.11 |
| 5,033,590 | 7/1991 | Kobayashi et al. . |
| 5,048,645 | 9/1991 | Thiel et al. . |
| 5,069,313 | 12/1991 | Kato et al. . |
| 5,249,647 | 10/1993 | Kobayashi et al. ..................... 188/72.3 |
| 5,538,103 | 7/1996 | Rueckert et al. . |
| 5,687,817 | 11/1997 | Kobayashi et al. ..................... 188/72.3 |

*Primary Examiner*—Robert J. Oberleitner
*Assistant Examiner*—Melanie Talavera
*Attorney, Agent, or Firm*—Wenderoth, Lind & Ponack, L.L.P.

[57] ABSTRACT

A disc brake includes a carrier with a pair of axially and outwardly extending arms. A pair of pad springs are mounted to the inner side of the arms. Each of the pad springs has a pair of return springs. The return springs extend radially of a rotor and have respective projections. Each of the return spring is made by bending an elongated tongue. A pair of backing plates are attached to a corresponding pair of friction pads and have lugs. A wear warning element is attached adjacent to the lug of each backing plate and has a bent portion. Each of the projections is resiliently in contact with the inner side of the bent portion so as to constantly urge the backing plate and the friction pad in a direction away from the rotor.

6 Claims, 6 Drawing Sheets

DISC BRAKE

BACKGROUND OF THE INVENTION

The present invention relates to a disc brake suitable for use in an automotive vehicle.

A typical disc brake includes a carrier including a pair of axially and outwardly extending arms extending over a rotor, a caliper slidably supported on the arms and extending over the rotor, a pair of inboard and outboard friction pads slidably mounted to the arms and urged into frictional engagement with opposite sides of the rotor by the caliper, and a pair of pad springs mounted to the arms and adapted to resiliently urge the inboard and outboard friction pads against the arms.

In such a disc brake, a piston disposed within the inboard side of the caliper is slid toward the rotor under the influence of hydraulic fluid when a pedal brake is depressed. The piston cooperates with the outboard side of the caliper to urge the inboard and outboard friction pads into frictional engagement with opposite sides of the rotor so as to apply a braking force thereto. When the pedal brake is released, the piston is moved back toward the inboard side of the caliper as the hydraulic fluid is no longer fed to the piston. As a result, the friction pads are separated from the rotor.

When the piston is returned to its initial position, the distance between the rotor and the friction pads is approximately half the amount of movement of the piston. Where the sliding resistance between the carrier and the friction pads is relatively large, the friction pads may remain in sliding contact with the rotor even after the pedal brake is released. This is commonly referred to as "drag" of the friction pads. Such drag brings about a reduction in fuel economy of the vehicle as well as the service life of the friction pads due to wear.

Various attempts have been made to overcome this problem. For example, Japanese laid-open utility model publication No. 56-21633 teaches the use of a wire spring which is generally V-shaped and extends over a rotor. A pair of friction pads have holes adjacent to the outer periphery of the rotor. Opposite ends of the wire spring are inserted into the holes so as to interconnect the friction pads and urge the friction pads in a direction away from each other. However, the direction in which a force is applied from the wire spring to the friction pads is inclined relative to the axis of the rotor. As such, the friction pads can not smoothly be slid on the arms of a carrier. This results in drag of the friction pads. Also, where the sliding resistance between the inboard friction pad and the corresponding arm is different from that between the outboard friction pad and the corresponding arm, these friction pads may not be separated by an equal distance from the rotor. As this occurs, one of the friction pads remains in sliding contact with the rotor, causing drag. Moreover, the use of the discrete wire spring results in an increase in the number of parts, and the formation of the holes results in an increase in the machining steps and production cost of the overall disc brake.

Japanese laid-open utility model publication No. 57-61237 discloses a disc brake wherein a pair of leaf springs or arms extend in the direction of rotation of a rotor and are inwardly bent from a pair of pad springs disposed between a pair of friction pads and a carrier. The leaf springs are contacted with confronting sides of the friction pads so as to constantly urge the friction pads in a direction away from the rotor. However, mere contact of the leaf springs with the friction pads is not sufficient to separate the friction pads from the rotor when a pedal brake is released. Also, the leaf springs extend outwardly from opposite sides of the pad spring. This requires a metal sheet of a larger width or size.

Accordingly, it is an object of the present invention to provide a disc brake which insures separation of a pair of inboard and outboard friction pads from a rotor when a pedal brake is released, which effectively eliminates the occurrence of "drag" of the friction pads, and which is economical to manufacture.

SUMMARY OF THE INVENTION

According to one aspect of the present invention, there is provided a disk brake comprising a carrier including a pair of axially and outwardly extending arms extending over a rotor, a caliper slidably supported on the arms and extending over the rotor, a pair of inboard and outboard friction pads slidably mounted to the arms and urged into frictional engagement with opposite sides of the rotor by the caliper, and a pair of pad springs mounted to the arms and adapted to resiliently urge the inboard and outboard friction pads against the arms.

As a feature of the invention, at least one of the pad springs includes a return spring configured to urge the inboard and outboard friction pads in a direction away from the rotor. This configuration insures separation of the friction pads from the rotor when a pedal brake is released.

Conveniently, the return spring is integral with the pad spring. The return spring is made by bending a radially extending elongated tongue. This arrangement reduces the overall width of a blank used to form the pad spring.

According to another aspect of the present invention, there is provided a disc brake including a carrier secured to a fixed part of a vehicle and having a pair of axial arms extending over a rotor, a caliper slidably supported on the two arms and extending over the rotor, and a pair of friction pad assemblies slidably mounted to the two arms through a corresponding pair of pad springs and urged into frictional engagement with opposite sides of the rotor when a pedal brake is depressed to cause the caliper to be moved toward the rotor. Each of the two pad springs comprises a bridge portion extending along a corresponding one of the two arms, a pair of legs depending from opposite ends of the bridge portion, respectively, the legs including a pair of flat plates extending downwardly from the bridge portion, a pair of guide plates extending downwardly from the flat plates and configured to slidably receive one end of the friction pad assemblies, a pair of extension plates extending downwardly from the guide plates, and a pair of pad rests extending from the extension plates and configured to support the friction pad assemblies, and at least one elongated return spring unitarily connected to a corresponding one of the legs and extending radially of the rotor. The return spring is operatively associated with a corresponding one of the friction pad assemblies whereby the friction pad assembly is urged in a direction away from the rotor.

Preferably, a pair of return springs are unitarily connected to the flat plates or the extension plates. The friction pad assemblies include a pair of friction pads, a corresponding pair of backing plates attached to the friction pads, and a pair of generally U-shaped plates having one end secured to the backing plates and the other end positioned at a point where the friction pads and the backing plates are joined. Advantageously, the other end of the plates serves as a means for detecting undue wear of the friction pad assemblies. The return springs have free ends engaged with the plates to thereby effectively separate the friction pads from the rotor when the pedal brake is released.

According to a further aspect of the present invention, there is provided a method of fabricating pad springs adapted for use in a disc brake which includes a carrier secured to a fixed part of a vehicle and having a pair of axial arms extending over a rotor, a caliper slidably supported on the arms and extending over the rotor, and a pair of friction pad assemblies slidably mounted to the arms through a corresponding pair of pad springs and urged into frictional engagement with opposite sides of the rotor when a pedal brake is depressed to cause the caliper to be moved toward the rotor. The method comprises the steps of preparing a metal sheet of a predetermined width, removing or cutting a plurality of generally C-shaped blanks from the metal sheet, each of the blanks comprising a bridge portion, a pair of elongated legs having a length and including a pair of flat plates depending from opposite ends of the bridge portion, a pair of guide plates extending from the flat plates, a pair of extension plates, and a pair of pad rests extending from the extension plates, and at least one return spring unitarily connected to one side of a corresponding one of the extension plates and extending substantially along the length of the legs, bending the bridge portion and the flat plates so that the bridge portion and the flat plates are fit over one side of the arms, bending the guide plates into a generally C-shaped configuration, bending the return spring so that the return spring extends radially of the rotor, and bending the extension plates and the pad rests so that the friction pad assemblies are supported by the pad rests.

BRIEF DESCRIPTION OF THE DRAWINGS

The present invention will now be described, by way of example, with reference to the accompanying drawings, in which.

DESCRIPTION OF THE PREFERRED EMBODIMENTS

Figure 1:
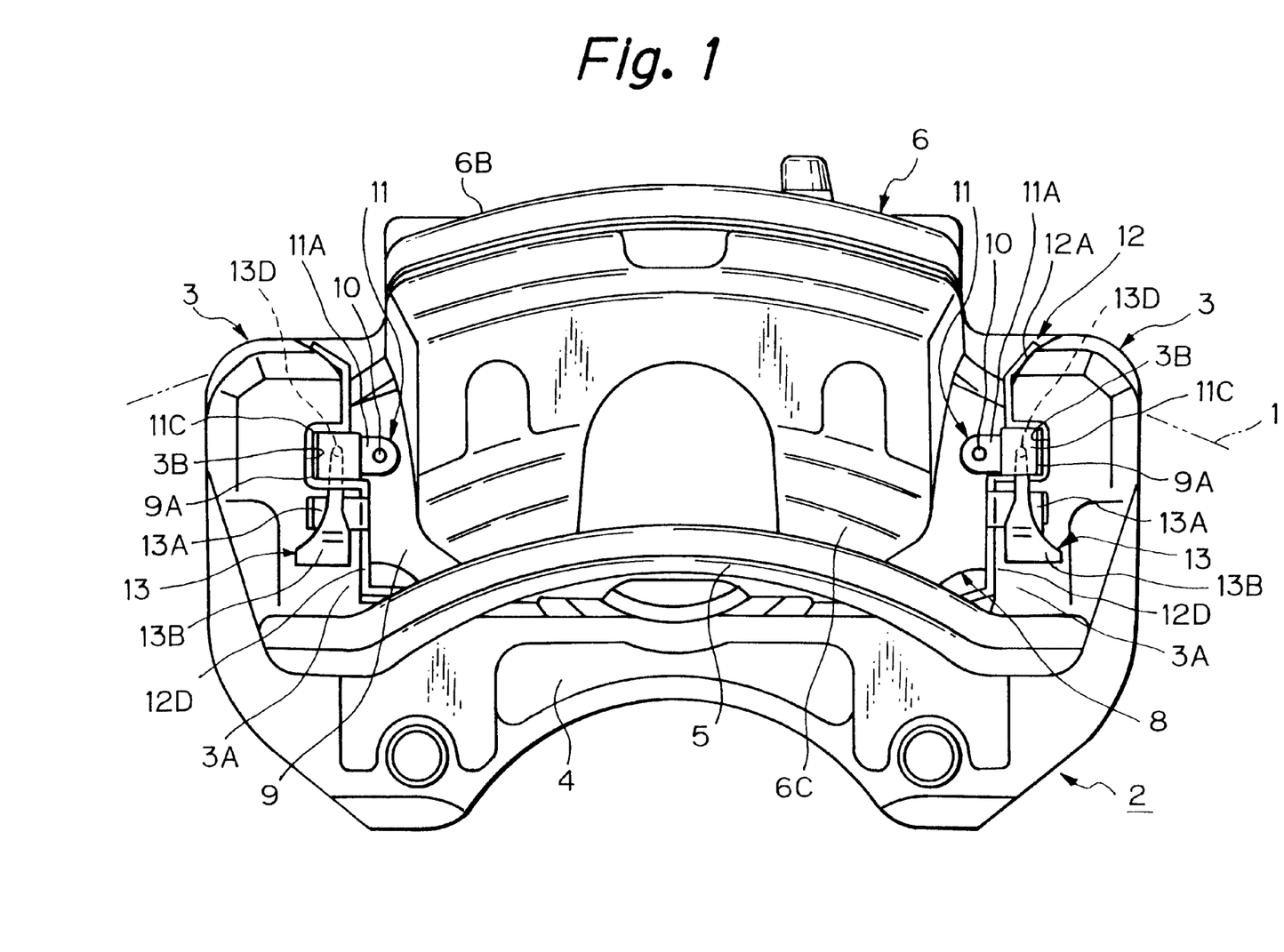
FIG. 1 is a front view of a disc brake made according to one embodiment of the present invention.
Figure 3:
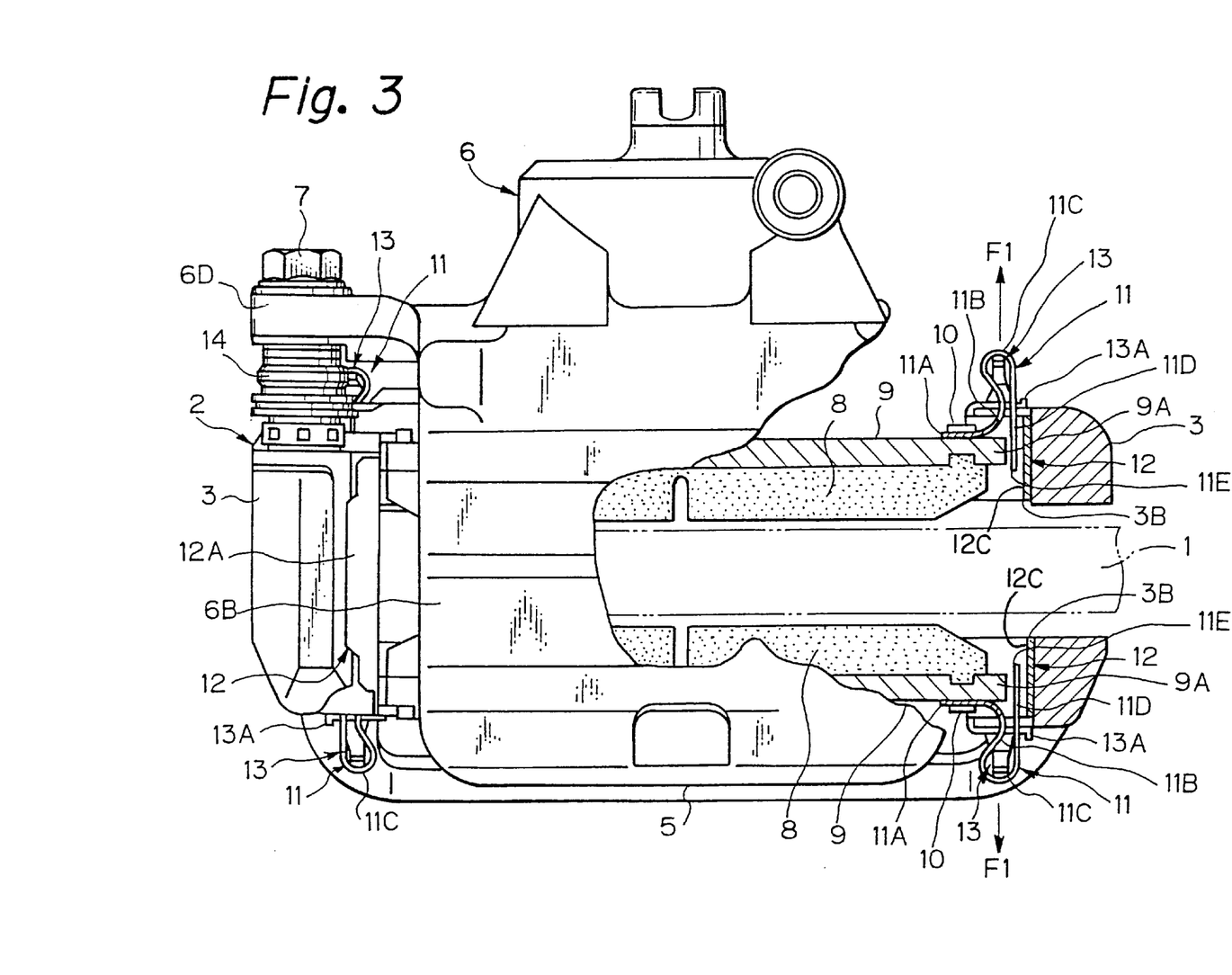
FIG. 3 is a top plan view, partly broken away, of the disc brake shown in FIG. 1.

Referring to the drawing and first, to FIGS. 1 and 3, a disc brake includes a disc or rotor 1 rotatable with a corresponding vehicle wheel (not shown), and an anchor or carrier 2 located at the inboard side of the disc 1 and secured to a fixed part of the vehicle. The carrier 2 includes a pair of axially and outwardly extending arms 3, 3 extending over the periphery of the rotor 1, a bridge portion 4 extending between the proximal ends of the arms 3, 3, and a sectorial beam 5 adapted to increase the rigidity of the carrier 2 and extending between the distal ends of the arms 3, 3.

Figure 2:
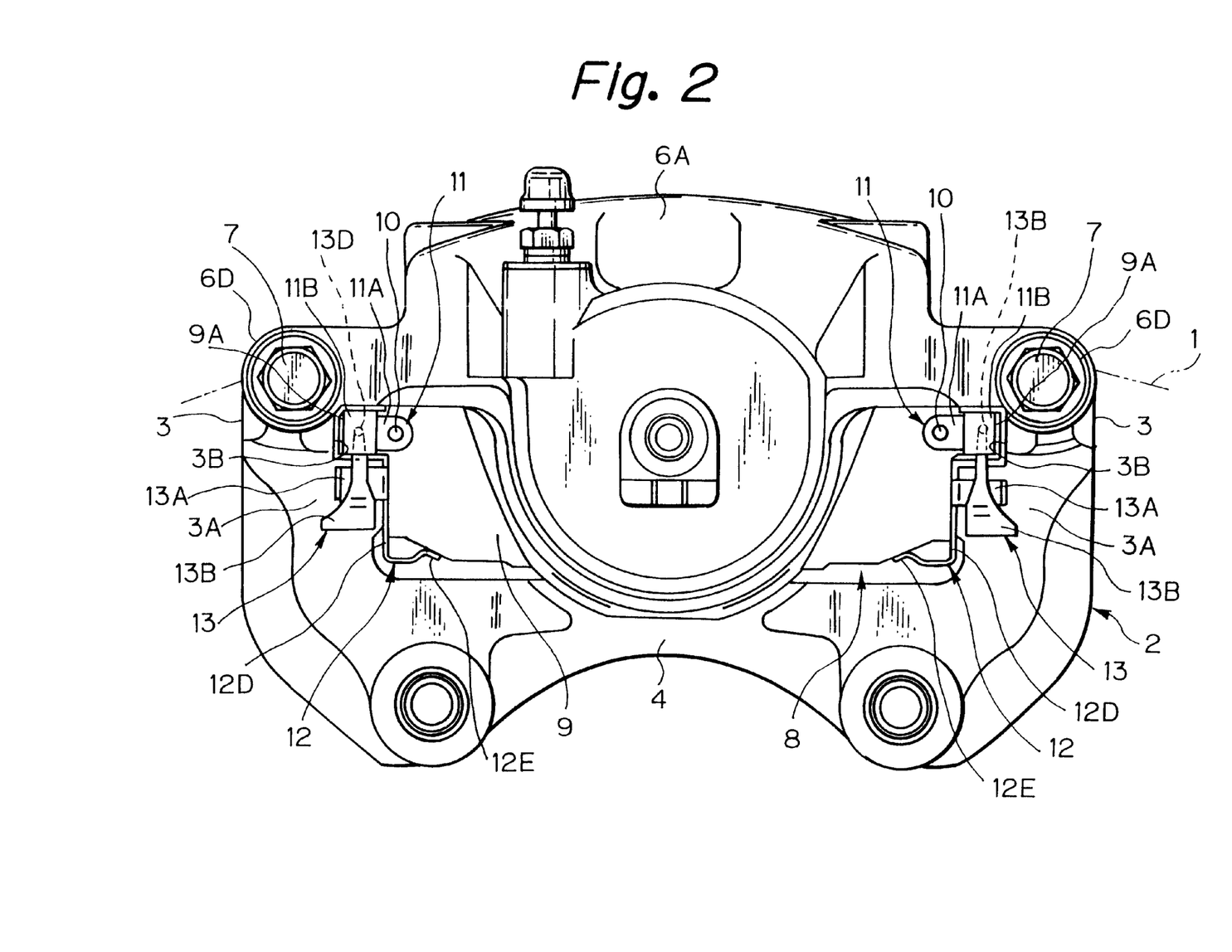
FIG. 2 is a rear view of the disc brake shown in FIG. 1.

As shown in FIGS. 1 and 2, each of the arms 3, 3 has a pair of radially inwardly extending torque bearings 3A, 3A located at its proximal (inboard) and distal (outboard) ends, and a pair of opposite pad guides 3B, 3B formed in its inner periphery and having a generally C-shaped section. The pad guides 3B, 3B cooperate with a pair of pad springs 12, 12 so as to slidably guide a corresponding pair of friction pads 8, 8 in the axial direction of the rotor 1.

A caliper 6 is slidably supported by the carrier 2. The caliper 6 includes an inboard leg 6A located at the inboard side of the rotor 1 and containing a cylinder (not shown), a bridge portion 6B extending over the rotor 1 between the arms 3, 3 of the carrier 2, a fork-shaped outboard leg 6C extending substantially parallel to the inboard leg 6A and depending from the outboard or front end of the bridge portion 6B, and a pair of flanges 6D, 6D extending outwardly from opposite ends of the inboard leg 6A.

Slide pins (not shown) have one end integrally mounted to the flanges 6D, 6D of the caliper 6 by bolts 7, 7 and the other end slidably fit into corresponding holes (not shown) which are formed in the arms 3, 3. This arrangement enables the caliper 6 to be axially slid relative to the carrier 2. A piston (not shown) is slidably disposed within the cylinder of the inboard leg 6A. When hydraulic fluid is forced into the cylinder, the piston is moved so as to urge the inboard and outboard friction pads 8, 8 into frictional engagement with opposite sides of the rotor 1.

The inboard and outboard friction pads 8, 8 are located at opposite sides of the rotor 1. The friction pads 8, 8 are elongated in a direction transverse to the axis of the rotor 1 and have a substantially sectorial shape. As shown in FIG. 3, corresponding pair of backing plates 9, 9 are attached to the inboard side of the inboard friction pad 8 and the outboard side of the outboard friction pad 8, respectively. As shown in FIGS. 1 and 3, the backing plates 9, 9 have opposite lugs 9A, 9A which are engaged within the corresponding pad guides 3B, 3B of the arms 3, 3 through guide plates 12C, 12C of the pad springs 12, 12 which will be described later. As shown in FIG. 3, the lugs 9A, 9A have projections 10, 10 used to clamp or otherwise secure one end of wear warning elements 11 between the backing plates 9, 9 and the projections 10, 10. The friction pads 8, 8 are slidably supported on the pad guides 3B, 3B through the lugs 9A, 9A. To produce a braking force, the caliper 6 is operated to urge the friction pads 8, 8 into frictional engagement with opposite sides of the rotor 1.

Referring to FIG. 3, the wear warning elements 11 are four in number and attached to the respective lugs 9A, 9A. The wear warning elements 11 are made from an elongated metal sheet by means of a punch press. Specifically, each of the wear warning elements 11 includes a flat proximal end 11A, a first bent portion 11B bent axially from the flat end 11A and having a generally U-shaped configuration, a second bent portion 11C bent axially from the first bent portion 11B and having a generally U-shaped configuration, and a flat distal end or warning portion 11D extending between the guide plate 12C of the pad spring 12 and the lug 9A of the backing plate 9 and terminating at a point where the backing plate 9 and the friction pad 8 are joined. The free end of the warning portion 11D forms a wear detecting portion 11E.

The projection 10 is bent so as to clamp or otherwise secure the flat end 11A to the backing plate 9 whereby the wear warning element 11 is firmly attached to the lug 9A. When the friction pad 8 is worn, the wear detecting portion 11D is brought into sliding contact with the rotor 1. The resulting noise gives warning to the driver.

Figure 4:
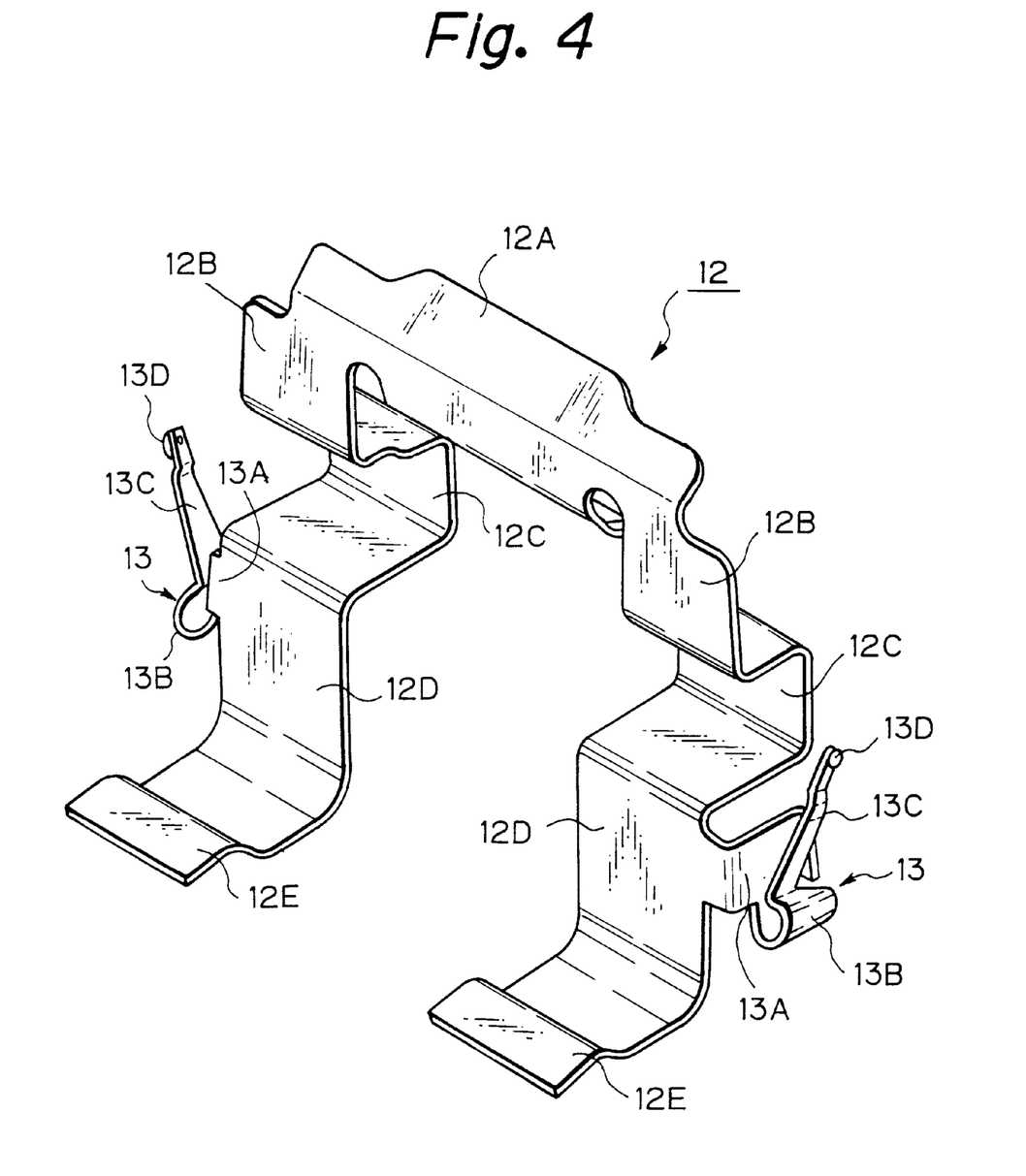
FIG. 4 is an enlarged perspective view of a pad spring shown in FIG. 1.

The pad springs 12, 12 are mounted to the arms 3, 3 of the carrier 2. Referring specifically to FIG. 4, each of the pad springs 12 generally includes a bridge portion 12A engaged with the inner surface of the arm 3, bent along two different lines and having a substantially V-shaped configuration, a pair of flat plates 12B, 12B extending radially inwardly from opposite ends of the bridge portion 12A, a pair of guide plates 12C, 12C bent radially outwardly from the flat plates 12B, 12B, engaged with the pad guides 3B, 3B of the arm 3 and having a substantially C-shaped configuration, a pair of depending extension plates 12D, 12D bent at approximately 90 degrees from the lower horizontal end of the guide plates 12C, 12C, and a pair of pad rests 12E, 12E bent at approximately 90 degrees from the front (lower) end of the extension plates 12D, 12D, having a substantially V-shaped front end and configured to resiliently abut the lower end of the backing plates 9, 9 and the friction pads 8, 8.

The pad rests 12E of the pad springs 12 are adapted to bias the lugs 9A of the backing plates 9 against the upper surface of the pad guides 3B (guide plates 12C) whereby the friction pads 8 are slidably supported in the axial direction of the rotor 1.

The extension plates 12D have integral return springs 13, 13. As shown in FIG. 4, the return springs 13, 13 include abutment portions 13A, 13A extending outwardly from the extension plates 12D, bent into a crank shape and configured to abut the inboard and outboard ends of the arm 3, wide bent portions 13B, 13B bent upwardly from the lower end of the abutment portions 13A, 13A and having a substantially U-shaped configuration, and elongated bias portions 13C, 13C extending upwardly from the upper end of the bent portions 13B, 13B, bent into a crank shape and terminating within the bent portions 11C, 11C of the wear warning element 11.

The bias portions 13C have integral semispherical projections 13D, 13D at their free end. The projections 13D, 13D are resiliently in point contact with the inner surface of the bent portions 11C of the wear warning elements 11 so as to normally bias the wear warning elements in opposite directions as shown by the arrows F1 in FIG. 3 and thus, urge the friction pads 8, 8 in a direction away from the rotor 1.

Figure 5:
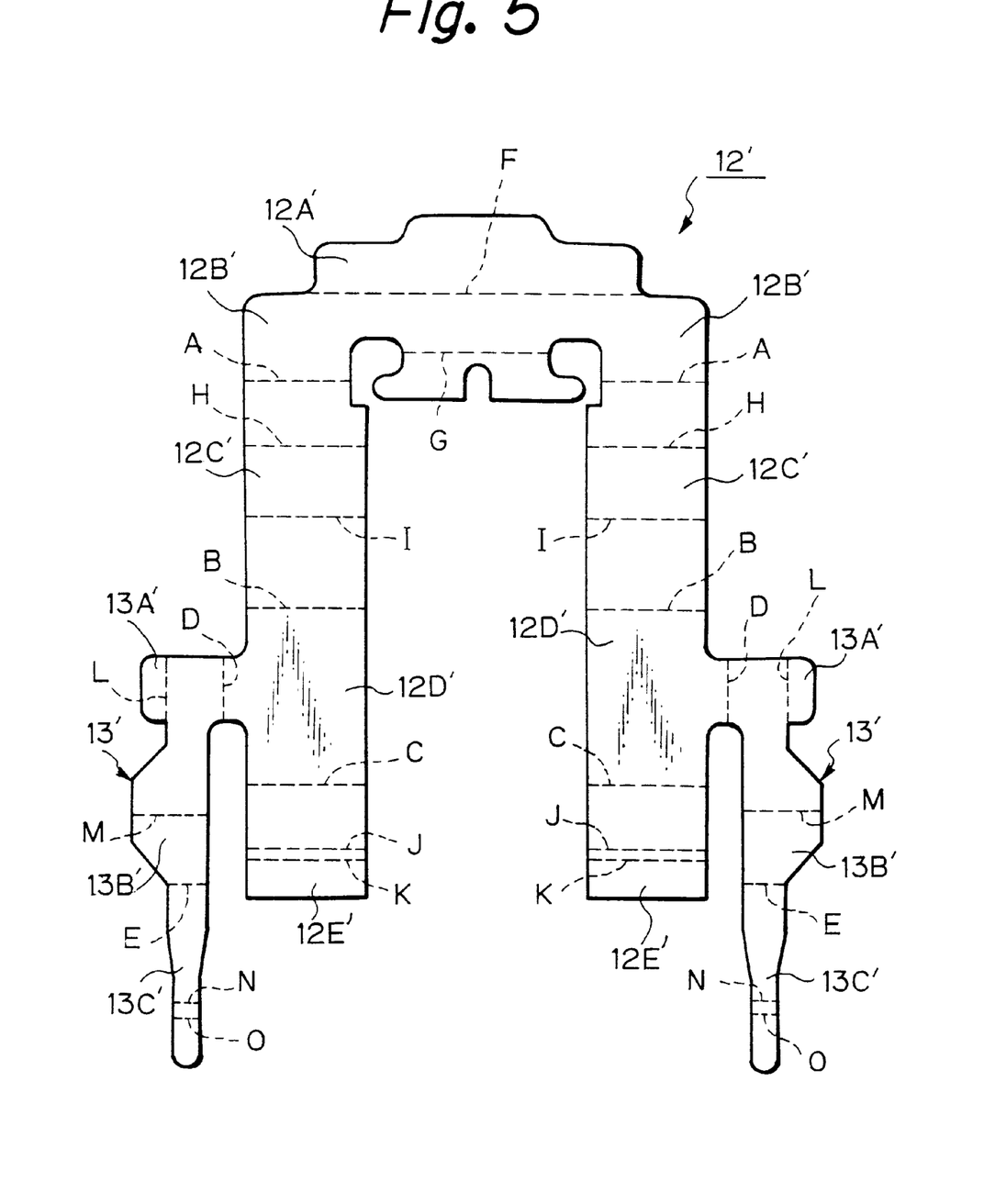
FIG. 5 is a front view of a blank used to form the pad spring shown in FIG. 4.

Referring to FIG. 5, the pad spring 12 is made from a sheet of metal such as stainless steel or other resilient material. The metal sheet is cut into a plurality of generally C-shaped blanks 12' by a punch press.

The blank 12' includes a bridge portion 12A' having a convexed upper end and a concaved lower end, a pair of right and left flat plates 12B', 12B' bifurcated downwardly from the lower end of the bridge portion 12A' and terminating at bending lines A, A, a pair of guide plates 12C', 12C' extending downwardly in a vertical direction from the lower end (positioned along the bending lines A, A) of the flat plates 12B', 12B' and terminating at bending lines B, B, a pair of extension plates 12D', 12D' extending downwardly from the lower end (positioned along the bending lines B, B) of the guide plates 12C', 12C' and terminating at bending lines C, C, and a pair of pad rests 12E', 12E' extending downwardly from the lower end (positioned along the bending lines C, C) of the extension plates 12D', 12D'.

A pair of tongues 13', 13' are integrally formed and extend outwardly in a horizontal direction from the extension plates 12D', 12D'. The tongues 13', 13' include abutment portions 13A', 13A' extending outwardly from the outer sides (positioned along bending lines D, D) of the extension plates 12D', 12D', wide bent portions 13B', 13B' depending from the lower ends of the abutment portions 13A', 13A', extending substantially along the length of the pad rests 12E', 12E' and terminating at bending lines E, E, and elongated bias portions 13C', 13C' extending downwardly from the lower ends of the bent portions 13B', 13B'.

The bridge portion 12A of the pad spring 12 is formed by outwardly bending the bridge portion 12A' along bending lines F, G to form a generally V-shaped configuration. The flat plates 12B are formed by outwardly bending the flat plates 12B' at substantially 90 degrees from the bending lines A, A. The guide plates 12C, 12C are formed by bending the guide plates 12C', 12C' along bending lines H, I to form a generally C-shaped configuration. The extension plates 12D, 12D are formed by outwardly bending the extension plates 12D', 12D' at substantially 90 degrees from the bending lines B, B. The pad rests 12E, 12E are formed by inwardly bending the pad rests 12E', 12E' along the bending lines C, C and further bending the free end of the pad rests 12E', 12E' along bending lines J, K to form a crank shape.

The return springs 13 are formed by bending the abutment portions 13A', 13A' along the bending lines, D, L to form a crank shape. The bent portions 13B, 13B are formed by bending the bent portions 13B', 13B' along bending lines M, M to form a substantially U-shaped onfiguration. The bias portions 13C, 13C are formed by bending the bias portions 13C', 13C' along the bending lines E, E so that the bias portions 13C', 13C' are inclined outwardly from the bent portions 13B, 13B. The free end of the bias portions 13C, 13C is then bent along bending lines N, O to form a crank shape. The free end of each of the bias portions 13C, 13C is punched to form the projection 13D of each of the bias portions 13C.

Reference numerals 14, 14 designate protective boots (only one is shown) extending around the slide pins and adapted to prevent entrance of rain or water into between the slide pins and the holes of the arms 3.

Operation of the disc brake thus constructed is as follows.

When a pedal brake (not shown) is depressed, the piston is moved toward the rotor 1 under the influence of hydraulic fluid. The inboard friction pad 8 is then urged into frictional engagement with the inboard side of the rotor 1. The caliper 2 is caused to slide on the carrier 2 to thereby apply an inwardly directed force to the outboard backing plate. This causes the outboard friction pad 8 to be brought into frictional engagement with the outboard side of the rotor 1. As a result, a braking force is applied to the rotor 1. When the pedal brake is released, the hydraulic fluid is no longer forced into the cylinder. The piston is moved back toward the inboard leg 6A of the caliper 6. As a result, the friction pads 8, 8 are moved away from the rotor 1.

As previously mentioned, the return springs 13 of the pad springs 12 serve to constantly urge the wear warning elements 11 in opposite directions as shown by the arrows F1, F1. This arrangement enables smooth sliding movement of the lugs 9A of the backing plates 9, 9 along the upper surface of the guide plates 12C and thus, facilitates separation of the frictions pads 8, 8 from the rotor 1. Thus, the present invention eliminates "drag" when the pedal brake is released and improves fuel economy.

In the illustrated embodiment, the return springs 13, 13 are integrally formed in the pad springs 12, 12. This arrangement eliminates the need for a wire or similar spring elements used in the prior art and reduces the number of required parts and fabrication steps.

Additionally, the tongues 13', 13' used to form the return springs 13, 13 extend substantially along the length of the extension plates 12D', 12D'. This configuration reduces the overall width of the blank 12' and thus, the cost of material since a larger number of blanks can be removed or cut from a given single sheet of metal.

Figure 6:
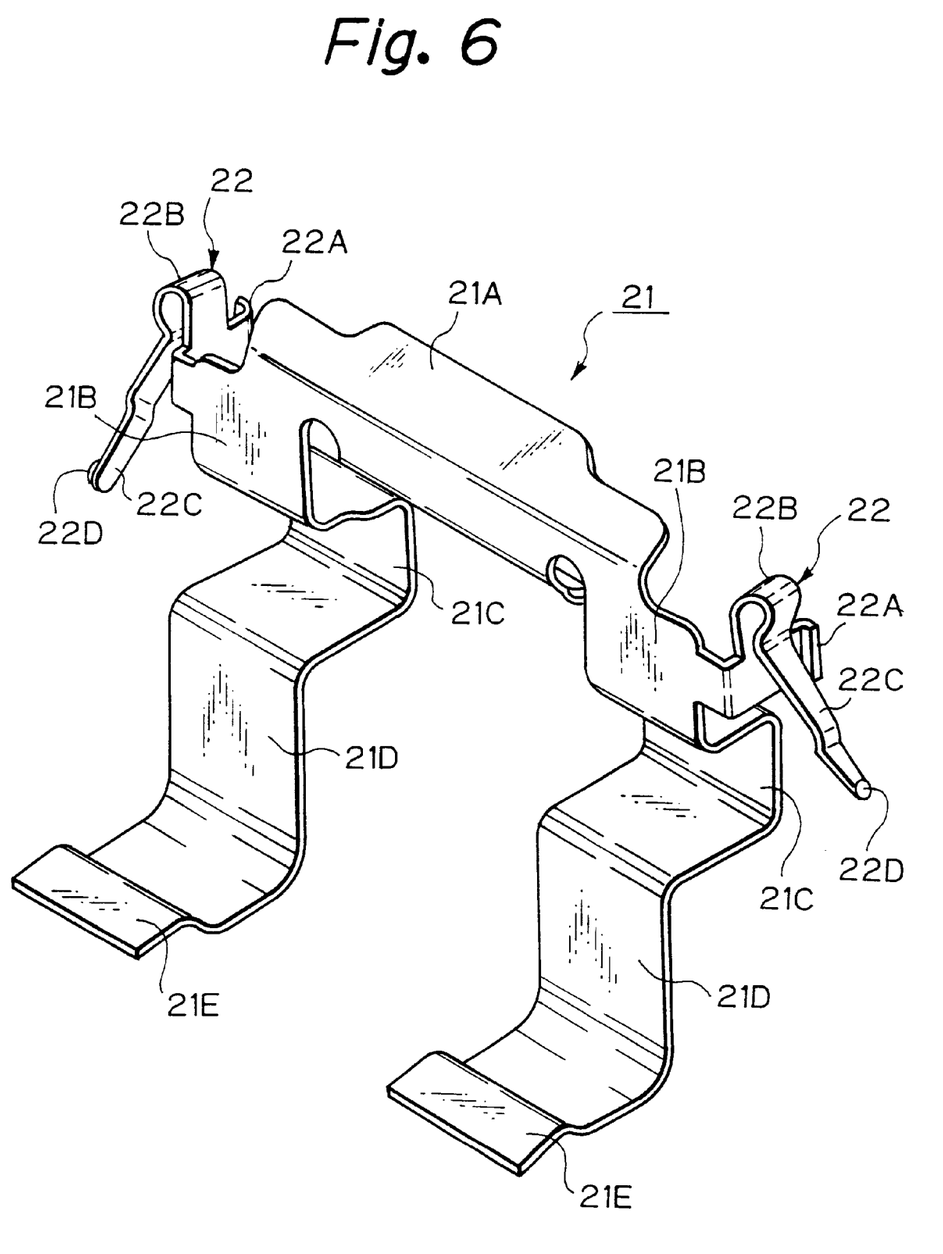
FIG. 6 is a view similar to that of FIG. 4, but showing a modified form of the pad spring.

FIG. 6 shows a modified form of the pad spring 12. Specifically, a pad spring 21 includes a bridge portion 21A, a pair of flat plates 21B, 21B, a pair of guide plates 21C, 21C, a pair of extension plates 21D, 21D, and pair of pad rests 21E, 21E as in the previous embodiment. A pair of return springs 22, 22 are unitarily connected to the outer side of the flat plates 21B, 21B rather than the extension plates. The return spring 22 is similar in structure to the return spring 13 of the previous embodiment and includes an abutment portion 22A, a bent portion 22B, a bias portion 22C and a projection 22D.

In the alternative embodiment, the pad springs 21, 21 are mounted to the arms 3, 3 of the carrier 2. The projection 22C of the return spring 22 is radially inserted within the bent portion 11C. The projection 22D are resiliently in point contact with the inner peripheral surface of the bent portion 11C. The return springs 21, 21, prior to assembly, extend substantially along the length of the flat plates 21B, 21B. This configuration reduces the overall width of a blank as in the previous embodiment.

In the embodiment shown in FIGS. 1 to 5, the return spring 13 serves to urge the wear warning element 11 which is attached to the lug 9A of the backing plate 9. The present invention is not limited to the use of the wear warning element 11. For example, a hook or similar member may be attached to the lug 9A of the backing plate 9, and the projection 13D of the return spring 13 may be resiliently contacted with the inner side of such a hook.

In the embodiment shown in FIG. 4, the return springs 13, 13 are attached to the respective extension plates 12D, 12D. Alternatively, additional return springs ay be attached to the flat plates 12B, 12B as in the embodiment shown in FIG. 6. This allows a greater degree of force to be applied to the bent portions 11C, 11C of the wear warning elements 11, 11 and thus, insures separation of the friction pads 8, 8 from the rotor 1.

Illustratively, the pad spring is provided with two return springs. Alternatively, a single return spring may be attached to one side of the pad spring. In such a case, a single wear warning element may be attached to the corresponding lug.

It will be understood that the present invention may equally be applied to a bicycle or a motorcycle.

Although the present invention has been described with respect to its preferred embodiments, various modifications may be made without departing from the scope of the invention as defined by the appended claims.

What is claimed is:

1. A disk brake comprising:
    a carrier including a pair of axially and outwardly extending arms, said pair of arms extending over a rotor;
    a caliper slidably supported on said pair of arms and extending over the rotor;
    a pair of inboard and outboard friction pads slidably mounted to said pair of arms and urged into frictional engagement with opposite sides of the rotor by said caliper; and
    a pair of pad springs mounted to said pair of arms and adapted to guide said pair of inboard and outboard friction pads,
    at least one of said pair of pad springs being formed by bending a sheet of material,
    said sheet including:
        a bridge portion;
        a pair of legs depending from opposite ends of said bridge portion in a vertical direction;
        a pair of horizontal portions, one of said horizontal portions extending from a corresponding one of said legs so as to be substantially perpendicular relative to a longitudinal direction of said leg and to be flush with said leg, and
        a pair of tongues, one of said tongues extending from a corresponding one of said horizontal portions in the same direction as said legs.

2. In a disc brake including a carrier secured to a fixed part of a vehicle and having a pair of axial arms extending over a rotor, a caliper slidably supported on said pair of arms and extending over said rotor, and a pair of friction pad assemblies slidably mounted to said pair of arms through a corresponding pair of pad springs and urged into frictional engagement with opposite sides of said rotor when a pedal brake is depressed to cause said caliper to be moved, each of said pair of pad springs comprising:
    a bridge portion extending along a corresponding one of said pair of arms;
    a pair of legs depending from opposite ends of said bridge portion, respectively, said pair of legs including a pair of flat plates extending downwardly from said bridge portion, a pair of guide plates extending downwardly from said pair of flat plates and configured to slidably receive one end of said pair of friction pad assemblies, a pair of extension plates extending downwardly from said guide plates, and a pair of pad rests extending from said pair of extension plates and configured to support said pair of friction pad assemblies; and
    at least one elongated return spring unitarily connected to a corresponding one of said pair of legs and extending radially of the rotor, said at least one return spring being operatively associated with a corresponding one of said pair of friction pad assemblies whereby said one friction pad assembly is urged in a direction away from said rotor.

3. The invention of claim 2, wherein a pair of return springs are unitarily connected to either one of said pair of flat plates and said pair of extension plates.

4. The invention of claim 3, wherein said pair of friction pad assemblies include a pair of friction pads, a corresponding pair of backing plates attached to said pair of friction pads, and a pair of generally U-shaped plates having one end secured to said pair of backing plates and the other end positioned at a point where said pair of friction pads and said pair of backing plates are joined, said other end of said pair of plates serving as means for detecting undue wear of said pair of friction pad assemblies, and wherein said pair of return springs have free ends engaged with said pair of plates.

5. A method of fabricating pad springs adapted for use in a disc brake, said disc brake including a carrier secured to a fixed part of a vehicle and having a pair of axial arms extending over a rotor, a caliper slidably supported on said pair of arms and extending over said rotor, and a pair of friction pad assemblies slidably mounted to said pair of arms through a corresponding pair of pad springs and urged into frictional engagement with opposite sides of said rotor when a pedal brake is depressed to cause said caliper to be moved toward said rotor, said method comprising the steps of:
    (a) preparing a metal sheet of a predetermined width;
    (b) removing a plurality of generally C-shaped blanks from said metal sheet, each of said plurality of blanks comprising a bridge portion, a pair of elongated legs having a length and including a pair of flat plates depending from opposite ends of said bridge portion, a pair of guide plates extending from said pair of flat plates, a pair of extension plates, and a pair of pad rests extending from said pair of extension plates; and at least one return spring unitarily connected to one side of a corresponding one of said pair of extension plates and extending substantially along the length of said pair of legs;

(c) bending said bridge portion and said pair of flat plates so that said bridge portion and said pair of flat plates are fit over one side of said pair of arms;

(d) bending said pair of guide plates into a generally C-shaped configuration;

(e) bending said at least one return spring so that said at least one return spring extends radially of said rotor; and (f) bending said pair of extension plates and said pair of pad rests so that said pair of friction pad assemblies are supported by said pair of pad rests.

6. A method of fabricating pad springs adapted for use in a disc brake, said disc brake including a carrier secured to a fixed part of a vehicle and having a pair of axial arms extending over a rotor, a caliper slidably supported on said pair of arms and extending over said rotor, and a pair of friction pad assemblies slidably mounted to said pair of arms through a corresponding pair of pad springs and urged into frictional engagement with opposite sides of said rotor when a pedal brake is depressed to cause said caliper to be moved toward said rotor, said method comprising the steps of:

(a) preparing a metal sheet of a predetermined width;

(b) removing a plurality of generally C-shaped blanks from said metal sheet, each of said plurality of blanks comprising a bridge portion, a pair of elongated legs having a length and including a pair of flat plates depending from opposite ends of said bridge portion, a pair of guide plates extending from said pair of flat plates, a pair of extension plates, and a pair of pad rests extending from said pair of extension plates; and at least one return spring unitarily connected to one side of a corresponding one of said pair of flat plates and extending substantially along the length of said pair of legs;

(c) bending said bridge portion and said pair of flat plates so that said bridge portion and said pair of flat plates are fit over one side of said pair of arms;

(d) bending said pair of guide plates into a generally C-shaped configuration;

(e) bending said at least one return spring so that said at least one return spring extends radially of said rotor; and (f) bending said pair of extension plates and said pair of pad rests so that said pair of friction pad assemblies are supported by said pair of pad rests.

* * * * *